United States Patent
Gan et al.

(10) Patent No.: US 9,425,914 B2
(45) Date of Patent: Aug. 23, 2016

(54) METHOD AND DEVICE FOR RELAY DEPLOYMENT IN A TDD COMMUNICATION NETWORK

(75) Inventors: Jiansong Gan, Beijing (CN); Rui Fan, Beijing (CN); Zhiheng Guo, Beijing (CN); Hai Wang, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 147 days.

(21) Appl. No.: 14/124,893

(22) PCT Filed: May 9, 2012

(86) PCT No.: PCT/SE2012/050492
§ 371 (c)(1),
(2), (4) Date: Dec. 9, 2013

(87) PCT Pub. No.: WO2012/177208
PCT Pub. Date: Dec. 27, 2012

(65) Prior Publication Data
US 2014/0119237 A1    May 1, 2014

(30) Foreign Application Priority Data

Jun. 21, 2011   (CN) .......................... 2011 1 0189899

(51) Int. Cl.
*H04J 3/08*     (2006.01)
*H04W 16/26*  (2009.01)
(Continued)

(52) U.S. Cl.
CPC ............... *H04J 3/08* (2013.01); *H04J 3/1694* (2013.01); *H04W 16/26* (2013.01); *H04W 84/047* (2013.01)

(58) Field of Classification Search
None
See application file for complete search history.

(56) References Cited

U.S. PATENT DOCUMENTS

| 8,537,724 | B2* | 9/2013 | Love ................. | H04B 7/15528 370/280 |
| 2010/0238845 | A1* | 9/2010 | Love ................. | H04B 7/15528 370/280 |

(Continued)

FOREIGN PATENT DOCUMENTS

| WO | 2010061053 A1 | 6/2010 |
| WO | 2010103048 A1 | 9/2010 |
| WO | 2011039970 A1 | 4/2011 |

OTHER PUBLICATIONS

Yanikomeroglu, H. et al., "Final assessment of relaying concepts for all CGs scenarios under consideration of related Winner L1 and L2 protocol functions," IST-4-027756 Winner II, D3.5.3, Version 1, Information Society Technologies, Sep. 2007, 58 pages.

(Continued)

*Primary Examiner* — Ayaz Sheikh
*Assistant Examiner* — Faiyazkhan Ghafoerkhan
(74) *Attorney, Agent, or Firm* — Withrow & Terranova, PLLC

(57) ABSTRACT

The embodiments disclose a method and base station for relay deployment in a Time Division Duplex (TDD) communication network. The method comprises configuring a first base station to operate as a donor base station, and configuring a second base station to operate as a relay node, wherein a first sector of the second base station is configured as a User Equipment (UE) part of the relay node and a second sector of the second base station is configured as a base station part of the relay node. The method further comprises allocating wireless resources for backhaul link between the first base station and the second base station and for access link between the second base station and a UE.

10 Claims, 3 Drawing Sheets

(51) Int. Cl.
*H04W 84/04* (2009.01)
*H04J 3/16* (2006.01)

(56) References Cited

U.S. PATENT DOCUMENTS

| | | | |
|---|---|---|---|
| 2011/0103292 A1* | 5/2011 | Pasad | H04B 7/155 370/315 |
| 2011/0103295 A1* | 5/2011 | Khandekar | H04W 72/04 370/315 |
| 2011/0235569 A1* | 9/2011 | Huang | H04W 28/02 370/315 |
| 2012/0028627 A1* | 2/2012 | Hunzinger | H04W 36/0083 455/422.1 |
| 2012/0127915 A1* | 5/2012 | Moberg | H04B 7/155 370/315 |
| 2012/0147794 A1* | 6/2012 | Chung | H04W 72/0406 370/280 |

OTHER PUBLICATIONS

Examination Report for European patent application 12723961.4, mailed Jan. 26, 2015, 7 pages.
International Preliminary Report on Patentability for PCT/SE2012/050492, mailed Jan. 9, 2014, 8 pages.
Author Unknown, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)," Technical Specification 36.300, Version 10.3.0, 3GPP Organizational Partners, Mar. 2011, 197 pages.
Author Unknown, "Technical Specification Group Radio Access Network; Evolved Universal Terrestrial Radio Access (E-UTRA); Physical layer for relaying operation (Release 10)," Technical Specification 36.216, Version 10.2.0, 3GPP Organizational Partners, Mar. 2011, 16 pages.
Author Unknown, "3rd Generation Partnership Project: Discussion on Relay Architecture (R3-091307)", 3rd Generation Partnership Project (3GPP TSG RAN WG3 Meeting #64), Item: 13.1, May 4-8, 2009, 5 pages, San Francisco, CA.
International Search Report for PCT/SE2012/050492, mailed Jul. 3, 2012, 3 pages.
Examination Report for European patent application 12723961.4, mailed Feb. 16, 2016, 6 pages.

* cited by examiner

METHOD AND DEVICE FOR RELAY DEPLOYMENT IN A TDD COMMUNICATION NETWORK

This application is a 35 U.S.C. §371 national phase filing of International Application No. PCT/SE2012/050492, filed May 9, 2012, the disclosure of which is incorporated herein by reference in its entirety.

TECHNICAL FIELD

The present technology generally relates to wireless communication, particularly to a method and base station for relay deployment in a Time Division Duplex (TDD) communication network.

BACKGROUND

Today, wireless communication network/systems such as $3^{rd}$ Generation Partner Project (3GPP) Long Term Evolution (LTE) have been widely deployed to provide various types of communication content, such as voice content and data content. It may be expected the mobile wideband traffic will increase dramatically, which raises higher demand on coverage and capacity of the system.

Currently, operators address this problem by increasing the density of deployment, typically, by deploying more base stations to cover broader areas and access more users. However, it is usually expensive for the operators to deploy new base stations. Base stations are connected to core network generally via wired connections such as optical fiber and cable. The construction of fiber and cable is expensive and time consuming, and the maintenance is also expensive. In some specific circumstance, construction of fiber and cable is not feasible due to geographic limitation. Although it is proposed to use microwave to connect the base stations and the core network, the property of microwave communication requires a line-of-sight transmission, which may seldom satisfied in scenarios like dense city.

As an alternative, the concept of relay is proposed in LTE-advanced (LTE-A) by 3GPP and standardized in 3GPP TS 36.216 V10.2.0 Physical layer for relaying operation (Release 10), March 2011 and 3GPP TS 36.300 V10.3.0, E-UTRAN Overall description; Stage 2 (Release 10), March 2011. FIG. 1 shows a schematic view of an existing LTE relay solution. As shown in FIG. 1 an intermediate node 120 referred to as relay node is added between a base station 120 and a User Equipment (UE). The base station 110 is herein referred to as donor base station or macro base station. The link between the donor base station 110 and the UE 130 is divided into two segments, where the link between the donor base station 110 and the relay node 120 is referred to as backhaul link (Un), and the link between the relay node 120 and the UE 130 is referred to as access link (Uu). The main task of the relay node 120 is to forward data between the donor base station 110 and the UE 130. In particular, in downlink, all the traffic which was destined from the base station 110 to the UE 130 is first transmitted to the relay node 120 and then forwarded to the UE 130 by the relay node 120; in uplink, all the traffic which was destined from the UE 130 to the base station 110 is first transmitted to the relay node 120 and then forwarded to the base station 110 by the relay node 120. Generally, the relay node 120 does not simply amplify and forward signals at the Layer 1 (PHY layer), but may implement protocols at the Layer 2 (including Medium Access Control (MAC)/Radio Link Control (RRC)) or even higher layer. The relay node 120 may be divided into two parts (not shown) in functionality. One part is referred to as UE part, which looks as if the UE from the perspective of the donor base station 110; the other part is referred to as base station part, which looks as if the base station from the perspective of the UE 130. In the downlink, the UE part of the relay node receives radio frequency (RE) signal and converts it to baseband signal. The base station part of the relay node processes the baseband signal, converts it to RF signal and transmits it to the UE 130. In the uplink, the base station part of the relay node receives RE signal from the UE 130 and converts it to baseband signal. The UE part of the relay node processes the baseband signal, converts it to RF signal and transmits it to the base station 110. Since the backhaul link Un between the relay node 120 and donor base station 110 could be LTE air interface instead of wired or microwave interface, the deployment of relay node may be economical and easy-to-implement as compared with deploying new base stations.

However, most of current research works on relay are focused on standardization, few on the implementation of relay product, especially the relay product for LTE TDD. Vendors may have to spend a lot of money and labor to develop and test relay products. In addition, operators may have difficulty in deployment and maintenance of new relay products, e.g. they need to do a considerable amount work on field debugging and personnel training.

SUMMARY

Therefore, it is an object to solve the above-mentioned problems.

According to an aspect of the embodiments, a method for relay deployment in a TDD communication network is provided. The method comprises configuring a first base station to operate as a donor base station; configuring a second base station to operate as a relay node, wherein a first sector of the second base station is configured as a User Equipment (UE) part of the relay node and the second sector of the second base station is configured as a base station part of the relay node; and allocating wireless resources for backhaul link between the first base station and the second base station and for access link between the second base station and a UE.

The TDD communication network may be a 3rd Generation Partnership Project (3GPP) Long Term Evolution (LTE) TDD network. The first base station and the second base station may be evolved Node B. The allocating may comprise allocating different sets of subframes for downlink of the backhaul link, downlink of the access link, uplink of the backhaul link and uplink of the access link respectively.

The first base station may be coupled to a core network of the communication network via wired connection. The backhaul link and the access link may be implemented in the same TDD protocol. Configuring the first base station may comprise configuring backhaul control channel and scheduling restrictions. Configuring the second base station may comprise configuring Multicast/Broadcast Single-Frequency Network (MBSFN) and scheduling restrictions for the base station part of the relay node and configuring transmitting/receiving parameters for the UE part of the relay node.

According to another aspect of the embodiments, a base station operating as a donor base station in a TDD communication network is provided. The base station comprises a processing unit; and a sector including a Remote Radio Unit (RRU). The processing unit is operable to configure the base station to operate as a donor base station, and the RRU is operable to be coupled to another base station operating as a relay node via backhaul link which is allocated with wireless resources.

The backhaul link may be allocated with different sets of subframes in uplink and downlink. The processing unit may be further operable to configure backhaul control channel and scheduling restrictions.

According to still another aspect of the embodiments, a base station operating as a relay node in a TDD communication network is provided. The base station comprises a processing unit; a first sector including a first RRU; and a second sector including a second RRU. The processing unit is operable to configure the base station to operate as a relay node, wherein the first sector is configured to operate as a UE part of the relay node and the second Sector is configured to operate as a base station part of the relay node, and the first RRU is operable to be coupled to another base station operating as a donor base station via backhaul link, and the second RRU is operable to be coupled to a UE via access link, both the backhaul link and the access link being allocated with wireless resources.

Different sets of subframes may be allocated for downlink of the backhaul link, downlink of the access link, uplink of the backhaul link and uplink of the access link respectively. The processing unit is further operable to configure MBSFN and scheduling restrictions for the base station part of the relay node and configure transmitting/receiving parameters for the UE part of the relay node.

According to still another aspect of the embodiments, a TDD communication network is provided, which comprises the above base station operating as a donor base station and at least one above base station operating as a relay node.

BRIEF DESCRIPTION OF THE DRAWINGS

The technology will be described in detail by reference to the following drawings, in which.

DETAILED DESCRIPTION

Figure 1:
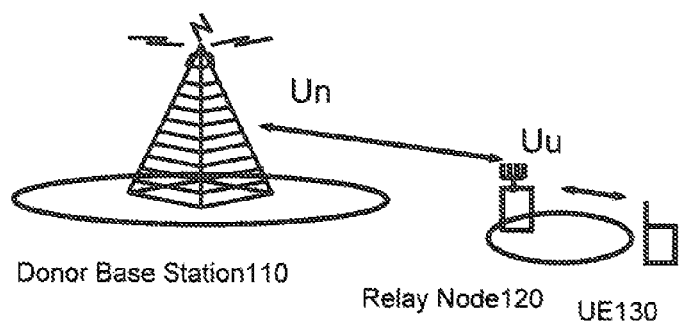
FIG. 1 shows a schematic view of an existing LTE relay solution.

Embodiments herein will be described more fully hereinafter with reference to the accompanying drawings, in which embodiments are shown. This embodiments herein may, however, be embodied in many different forms and should not be construed as limited to the embodiments set forth herein. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features integers steps, operations, elements, and/or components, but do not preclude the presence or addition of one or more other features, integers, steps, operations, elements, components and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may contain, store, communicate, propagate, or transport the program for use by or in connection with the instruction execution system, apparatus, or device.

Although the technology herein is described with reference to the LTE TDD communication network in the context, it should understand that the embodiments are not limited to this, but may indeed be applied to all TDD communication networks that need relay. Although specific terms in some specifications are used here, such as evolved Node B (eNB), Remote Radio Unit (RRU), it should understand that the embodiments are not limited to those specific terms but may be applied to all similar entities.

Embodiments herein will be described below with reference to the drawings.

In TDD communication networks such as LTE TDD, the duplex between the uplink and downlink is implemented by time division mechanism. That is, the uplink and downlink operate on the same frequency band and are allocated with different time slots for transmitting data. According to an aspect the characteristic that TDD uplink and downlink use same frequency band is taken into consideration, and it is propose to use existing TDD base stations to implement the relay node and form the relay network.

Figure 2:
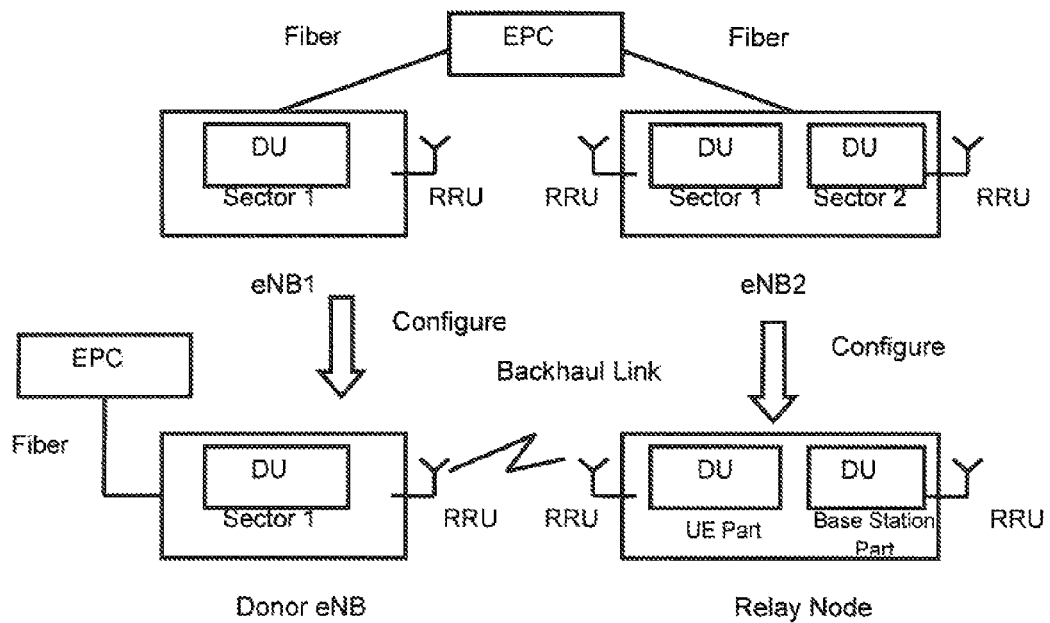
FIG. 2 shows a schematic view of forming a relay network using existing LTE TDD base stations in accordance with an embodiment.

FIG. 2 shows a schematic view of forming a relay network using existing LTE TDD base stations in accordance with an embodiment.

The upper part of FIG. 2 shows an existing LTE TDD network architecture without relay. In this example, two base stations eNB1 and eNB2 cover their cells respectively. Suppose eNB1 has a sector (sector 1) which communicates with UEs in coverage via RRU, eNB2 has two Sectors (Sector 1 and sector 2) which communicates with UEs in coverage via respective RRU. In addition to RRU, each sector may include Digital Unit (DU). It is understood that in practice a plurality of sectors may sham one DU. Both eNB1 and eB2 are typically connected to Evolved Packet Core (EPC) via fiber. As discussed above, the construction of fiber is often expensive and difficult.

The lower part of FIG. 2 shows implementing a relay network by upgrading the existing base stations. In particular, the base station eNB1 is configured to operate as a donor base station and the base station eNB2 is configured to operate as a relay node. The configuration may be implemented by, e.g. upgrading software in eNB1 and eNB2. Since the donor bases station and relay node have been standardized in the 3GPP specifications as mentioned above, the skilled in the art may design corresponding software to implement their functionality. eNB2 which is configured as the relay node forwards data between the UEs in coverage of eNB2 and the donor eNB. The sector 1 of eNB2 may be configured as a UE part of the relay node, which communicates by the RRU of the sector 1 with the RRU of the sector 1 of eNB1 via LTE air interface. The sector 2 of eNB2 may be configured as a base station part of the relay node, which communicates by the RRU of the sector 2 with the UE via the LTE air interface. As consequence, the donor eNB needs only to connect to EPC via fiber, while the backhaul link between the donor eNB and the relay node may be wireless. As compared with the connections in the upper part of FIG. 2, eNB2 which is configured as the relay node does not need to connect to EPC via fiber. In LTE TDD network, the uplink and downlink share the same frequency band, i.e. the RRU of sector 1 of base station eNB1 and the UE use the same frequency band to transmit and receive data. Once the base station eNB2 is configured as the relay node, the RRUs of its two sectors still forward data using the same frequency band as before, which means the base station eNB2 may be configured as the relay node without any modification in hardware. Also, the base station eNB1 may be configured as the donor base station without any modification in hardware. Configuring the base station eNB1 may include configuring backhaul control channel and scheduling restrictions. The configuring the base station eNB2 may include configuring Multicast/Broadcast Single-Frequency Network (MBSFN), etc. for the base station part of the relay node and configuring transmitting/receiving parameters, etc. for the UE part of the relay node. Although one relay node is shown in FIG. 2, in practice the number of relay nodes may be more than one.

As mentioned above, the backhaul link between eNB1 configured as the donor eNB and eNB2 configured as the relay node and the access link between the eNB2 configured as the relay node and the UE use the same frequency band in both uplink and downlink.

Figure 3:
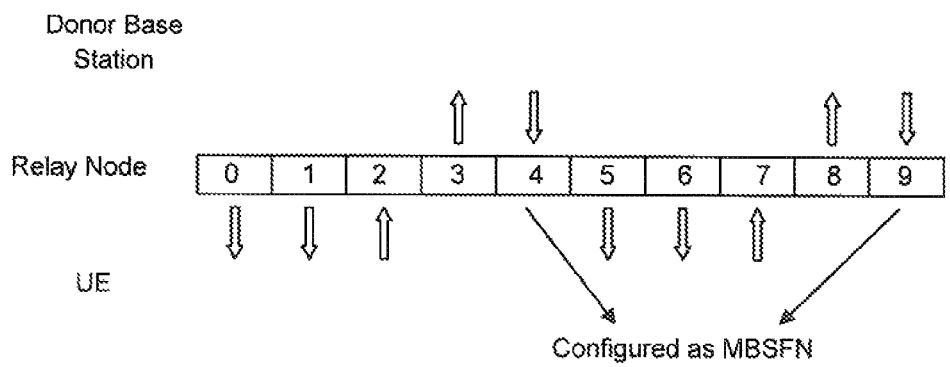
FIG. 3 shows an example of subframe allocation in the relay network in accordance with an embodiment.

FIG. 3 shows an example of subframe allocation in the relay network in accordance with an embodiment.

In the example, suppose the relay network in FIG. 2 operates in TDD Configuration 1, i.e. the ratio between downlink and uplink is 3:2. As shown in FIG. 3, in a 10 ms radio frame, four downlink subframes (0, 1, 5, 6) and two uplink subframes (2, 7) are allocated to the access link, and the remaining two downlink subframes (4, 9) and two uplink subframes (3, 8) are allocated to the backhaul link. For backward compatibility to users of LTE Release 8, subframes 4 and 9 may be configured in the relay cell as MBSFN subframes, so that the relay node does not need to send any signal to UEs during the broadcasting period of subframes 4 and 9, but use this period to receive signal from the donor base station.

The communications between the donor base station and the relay node will not interfere each other since the uplink and downlink of the access link and backhaul link are respectively allocated with different subframe sets.

Figure 4:
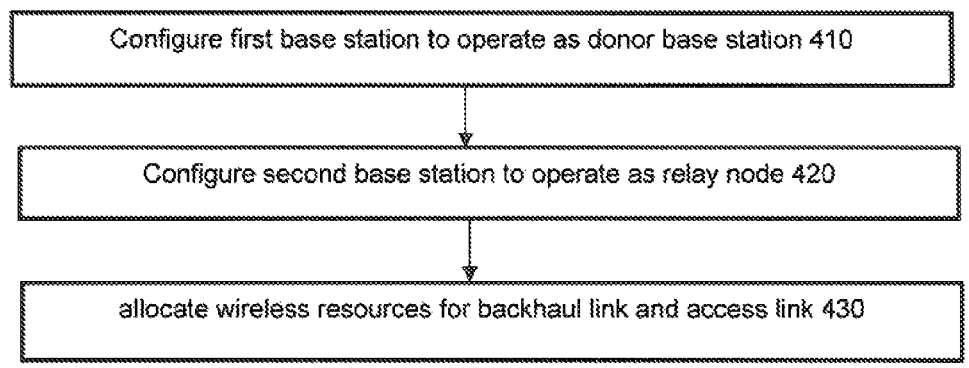
FIG. 4 shows a flowchart of a method for relay deployment in a TDD communication network in accordance with an embodiment.

FIG. 4 shows a flowchart of a method for relay deployment in a TDD communication network in accordance with an embodiment.

In step S410, a first base station is configured to operate as a donor base station. In step S420, a second base station is configured to operate as a relay node, wherein a first sector of the second base station is configured as a UE part of the relay node and the second sector of the second base station is configured as a base station part of the relay node. In step S430, wireless resources are allocated for backhaul link between the first base station and the second base station and for access link between the second base station and the UE.

The TDD communication network may be a 3GPP LTE TDD network, and the first base station and the second base station may be eNB. The allocating may comprise allocating different sets of subframes for downlink of the backhaul link, downlink of the access link, uplink of the backhaul link and uplink of the access link respectively. The first base station may be coupled to a core network of the communication network via wired connection. The backhaul link and the access link may be implemented in the same TDD protocol. Configuring the first base station may comprise configuring backhaul control channel and scheduling restrictions. Configuring the second base station may comprise configuring MBSFN and scheduling restrictions for the base station part of the relay node and configuring Transmitting/receiving parameters for the UE part of the relay node.

Figure 5:
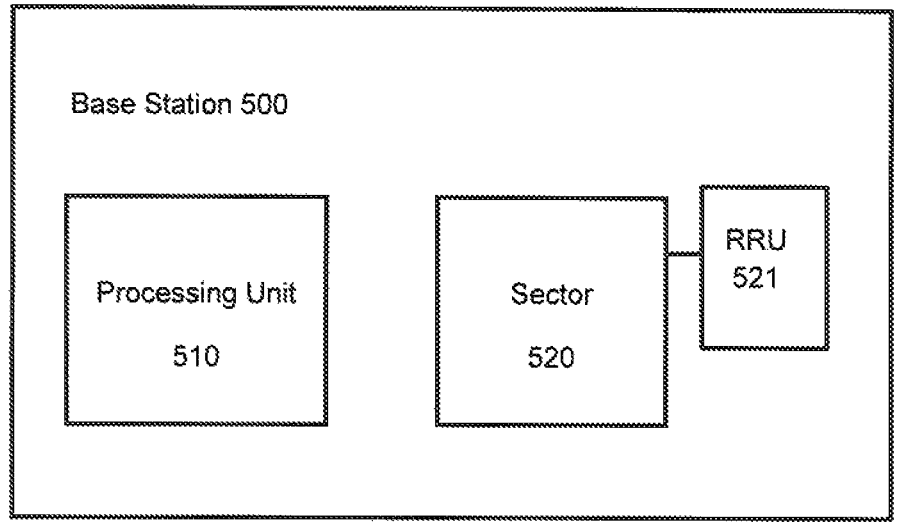
FIG. 5 shows a block diagram of a base station 500 operating as a donor base station in the TDD communication network in accordance with an embodiment.

FIG. 5 shows a block diagram of a base station 500 operating as a donor base station in the TDD communication network in accordance with an embodiment; and The base station 500 comprises a processing unit 510 and a sector 520 including a RRU 521. The sector 520 may further comprise a DU (not shown). The processing unit 510 is operable to configure the base station 600 to operate as a donor base station. The RRU is operable to be coupled to another base station operating as a relay node via backhaul link which is allocated with wireless resources. The backhaul link may be allocated with different sets of subframes in uplink and downlink. The processing unit is further operable to configure backhaul control channel and scheduling restrictions.

Figure 6:
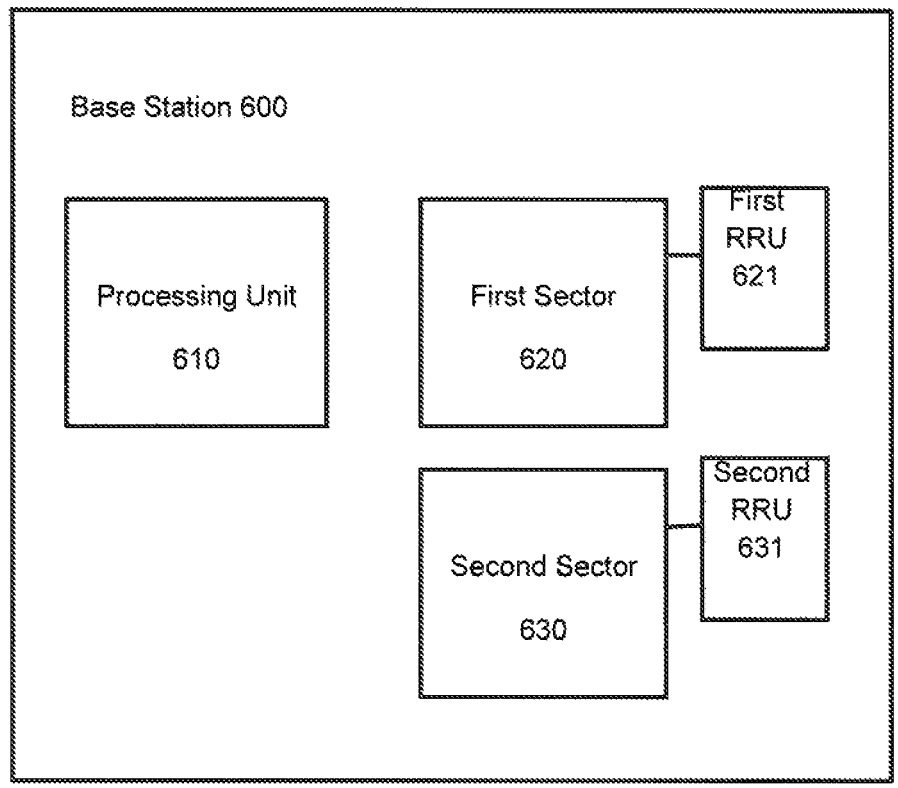
FIG. 6 shows a block diagram of a base station 600 operating as a relay node in the TDD communication network in accordance with an embodiment.

FIG. 6 shows a block diagram of a base station 600 operating as a relay node in the TDD communication network in accordance with an embodiment:

The base station 600 comprises a processing unit 610, a first sector 620 including a first RRU 621 and a second sector 630 including a second RRU 631. The sectors 620 and 630 may further comprise a DU (not shown). The processing unit 610 is operable to configure the base station 600 to operate as a relay node, wherein the first sector 620 is configured to operate as a UE part of the relay node and the second sector 630 is configured to operate as a base station part of the relay node. The first RRU 621 is operable to be coupled to another base station operating as a donor base station via backhaul link, and the second RRU 631 is operable to be coupled to a UE via access link. Both the backhaul link and the access link are allocated with wireless resources.

Different sets of subframes may be allocated for downlink of the backhaul link, downlink of the access link, uplink of the backhaul link and uplink of the access link respectively. The processing unit 610 is further operable to configure MBSFN and scheduling restrictions for the base station part of the relay node and configure transmitting/receiving parameters for the UE part of the relay node.

Existing TDD base stations are relatively mature products. By implementing the relay products with existing base stations, vendors may save the time and cost for developing and testing new relay products, and operators may easily deploy and maintain the relay products. In addition, the solution of using existing TDD base stations as relay products has a high scalability. In case that the traffic in coverage area of a relay node keeps increasing and the relay may not meet the demand, it is possible to upgrade this area to a normal cell covered by the TDD base station by recovering the relay node to the TDD base station and connecting it to the core network via fiber or other approaches. In this way, the operator's investment on relay may be protected.

While the embodiments have been illustrated and described, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

What is claimed is:

1. A method for relay deployment in a Time Division Duplex (TDD) communication network, the method comprising:
   configuring a first base station to operate as a donor base station;
   configuring a second base station to operate as a relay node, wherein a first sector of the second base station having a first antenna is configured as a User Equipment (UE) part of the relay node and a second sector of the second base station having a second antenna is configured as a base station part of the relay node, wherein while the first sector is operating as the UE part the first sector is not operating as the base station part and wherein while the second sector is operating as the base station part the second sector is not operating as the UE part; and
   allocating wireless resources for backhaul link between the first base station and the second base station using the first sector of the second base station and for access link between the second base station and a UE using the second sector of the second base station.

2. The method of claim 1, wherein the TDD communication network is a 3rd Generation Partnership Project (3GPP) Long Term Evolution (LTE) TDD network, and the first base station and the second base station are evolved Node B.

3. The method of claim 1, wherein said allocating comprises:
   allocating different sets of subframes for downlink of the backhaul link, downlink of the access link, uplink of the backhaul link and uplink of the access link respectively.

4. The method of claim 1, wherein the first base station is coupled to a core network of the communication network via wired connection.

5. The method of claim 1, wherein the backhaul link and the access link are implemented in the same TDD protocol.

6. The method of claim 1, wherein said configuring the first base station comprises configuring backhaul control channel and scheduling restrictions.

7. The method of claim 1, wherein said configuring the second base station comprises configuring Multicast/Broadcast Single-Frequency Network (MBSFN) and scheduling restrictions for the base station part of the relay node and configuring transmitting/receiving parameters for the UE part of the relay node.

8. A base station operating as a relay node in a Time Division Duplex (TDD) communication network, comprising:
   at least one processor;
   a first sector including a first Remote Radio Unit (RRU) and a first antenna; and
   a second sector including a second RRU and a second antenna,
   wherein the at least one processor is configured to configure the base station to operate as a relay node, wherein the first sector is configured to operate as a User Equipment (UE) part of the relay node and the second sector is configured to operate as a base station part of the relay node, wherein while the first sector is operating as the UE part the first sector is not operating as the base station part and wherein while the second sector is operating as the base station part the second sector is not operating as the UE part, and
   wherein the first RRU is configured to be coupled to another base station operating as a donor base station via backhaul link using the first sector, and the second RRU is configured to be coupled to a UE via access link using the second sector, both the backhaul link and the access link being allocated with wireless resources.

9. The base station of claim 8, wherein different sets of subframes are allocated for downlink of the backhaul link, downlink of the access link, uplink of the backhaul link and uplink of the access link respectively.

10. The base station of claim 8, wherein the at least one processor is further configured to configure Multicast/Broadcast Single-Frequency Network (MBSFN) and scheduling restrictions for the base station part of the relay node and configure transmitting/receiving parameters for the UE part of the relay node.

* * * * *